United States Patent
Song

(10) Patent No.: US 9,013,222 B2
(45) Date of Patent: Apr. 21, 2015

(54) EQUALIZER CIRCUIT AND RECEIVER CIRCUIT INCLUDING THE SAME

(71) Applicant: SK Hynix Inc., Gyeonggi-do (KR)

(72) Inventor: Taek-Sang Song, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 13/970,192

(22) Filed: Aug. 19, 2013

(65) Prior Publication Data

US 2014/0312953 A1   Oct. 23, 2014

(30) Foreign Application Priority Data

Apr. 17, 2013  (KR) .......... 10-2013-0042203

(51) Int. Cl.
 *H03L 5/00* (2006.01)
 *H04L 25/00* (2006.01)
 *H04L 25/03* (2006.01)

(52) U.S. Cl.
 CPC .......... *H04L 25/00* (2013.01); *H04L 25/03878* (2013.01)

(58) Field of Classification Search
 USPC ............... 327/306, 333, 331, 308; 333/81 R
 See application file for complete search history.

(56) References Cited

U.S. PATENT DOCUMENTS

| | | | |
|---|---|---|---|
| 6,031,389 A * | 2/2000 | Fotouhi et al. | 326/31 |
| 2005/0179480 A1* | 8/2005 | Shin | 327/333 |
| 2012/0049946 A1 | 3/2012 | Boecker | |

OTHER PUBLICATIONS

Palermo, S., Lecture on RX FIR & CTLE Equalization, Analog & Mixed-Signal Center, Texas A&M University, 2010.

* cited by examiner

*Primary Examiner* — Dinh Le

(74) *Attorney, Agent, or Firm* — IP & T Group LLP

(57) ABSTRACT

An equalizer circuit includes an input terminal, a pull-up driving unit suitable for pull-up driving an output terminal based on a signal of the input terminal, a pull-down driving unit suitable for pull-down driving the output terminal, and a capacitor connected between the input terminal and the output terminal.

15 Claims, 5 Drawing Sheets

EQUALIZER CIRCUIT AND RECEIVER CIRCUIT INCLUDING THE SAME

CROSS-REFERENCE TO RELATED APPLICATIONS

The present application claims priority of Korean Patent Application No. 10-2013-0042203, filed on Apr. 17, 2013, which is incorporated herein by reference in its entirety.

BACKGROUND

1. Field

Exemplary embodiments of the present invention relate to an equalizer circuit and a receiver circuit including the same.

2. Description of the Related Art

In electrical systems, a signal is transmitted within an integrated circuit (IC) chip or between two or more IC chips. When a signal is transmitted between two or more IC chips, the signal may be transmitted through a transmission line, a cable, or other means on a printed circuit board (PCB). Furthermore, even when a signal is transmitted within an IC chip, the signal may be transmitted through a line within the chip. When a signal is transmitted from a transmitting terminal to a receiving terminal, a signal loss occurs. Therefore, in many cases, a circuit to compensate for the signal loss may be provided at the receiving terminal.

An equalizer or a continuous time linear equalizer (CTLE) circuit compensates for the signal loss during high speed signal transmission. FIG. 1 is a diagram illustrating frequency responses of a channel 101, an equalizer 102, and a signal 103 recovered by the equalizer. In FIG. 1, the frequency response 101 of the channel represents a signal loss in the channel (signal transmission line). As the frequency of a transmitted signal increases, the signal loss gradually increases. The frequency response 102 of the equalizer represents a frequency response characteristic of the equalizer. The equalizer is designed to have a high gain as the frequency of a signal increases. The frequency response 103 represents a frequency response characteristic of the signal recovered by the equalizer. While the signal loss on the channel increases v with the increase in frequency of the signal, the gain of the equalizer increases with the increase in frequency of the signal. Thus, the signal recovered by the equalizer has a constant response characteristic in a wide frequency band.

FIG. 2 is a configuration diagram of a conventional equalizer 200.

Referring to FIG. 2, the equalizer 200 includes resistors 201 to 207 and capacitors 208 and 209. The equalizer 200 equalizes input signals IN and INB of a first terminal IN and a second terminal INB. A differential amplifier 210 differentially amplifies the equalized signals IN_E and INB_B and senses the levels of the input signals IN and INB.

The frequency response characteristic of the equalizer 200 is controlled by resistance values Rvar of variable resistors 204 and 205. By adjusting the resistance values Rvar of the variable resistors 204 and 205, the frequency response characteristic of the equalizer 200 is optimized as the frequency response 102 of the equalizer indicated in FIG. 1, which compensates for the signal loss 101 in the channel as indicated in FIG. 1. Adjustment of the resistance values of the variable resistors 204 and 205 changes not only the frequency response characteristic of the equalizer 200 but also the voltage levels of the equalized signals IN_E and INB_E. FIG. 3 illustrates low voltage value of the signals IN_E and INB_E according to the resistance values Rvar of the variable resistors 204 and 205. The low voltage value indicates voltage value of the equalized signals IN_E and INB_E when the signals IN_E and INB_E are of a low level. Referring to FIG. 3, it can be seen that, as the resistance values Rvar of the variable resistors 204 and 205 increase, the voltage level of the equalized signals IN_E and INB_E decreases.

The change of voltage levels of the equalized signals IN_E and INB_E has no influence on a fully-differential system in which the voltage level of the equalized input signal bar INB_E is changed together with the variation in voltage level of the equalized input signal IN_E.

However, the variation in voltage level of the equalized input signal IN_E may raise a concern in a pseudo-differential system transmitting the input signal IN in a single-ended manner and using a reference voltage VREF to determine the logic value of the input signal IN. That is because the variation of the level of the equalized input signal IN_E without change of the level of the reference voltage VREF may raise a concern in determining the logic level of the input signal IN. Equalizing the reference voltage VREF is not a solution to such a concern. A large amount of current inevitably passes through the equalizer 200 because of termination resistors 201, 204, and 205, which makes the reference voltage VREF difficult to be equalized by the equalizer 200, because the reference voltage VREF supplied from the pseudo-differential system is driven through a very weak current, which corresponds to a several tenths of the driving current of the input signals IN and INB.

In short, it is not appropriate to use the equalizer 200 in the pseudo-differential system because variation of the voltage level of the equalized input signal IN_E is inevitable in adjusting of the equalizer 200 while it is not appropriate to equalize the reference voltage VREF by the equalizer 200.

SUMMARY

Various embodiments are directed to an equalizer circuit suitable for the pseudo-differential signal transmission system and a receiver circuit including the same.

In an embodiment, an equalizer circuit may include an input terminal, a pull-up driving unit suitable for pull-up driving an output terminal in response to a signal of the input terminal, a pull-down driving unit suitable for pull-down driving the output terminal, and a capacitor connected between the input terminal and the output terminal.

In an embodiment, a receiver circuit may include a first input terminal, a first pull-up driving unit suitable for pull-up driving a first output terminal based on a signal of the first input terminal, a first pull-down driving unit suitable for pull-down driving the first output terminal, a first capacitor connected between the first input terminal and the first output terminal, a second input terminal, a second pull-up driving unit suitable for pull-up driving a second output terminal based on a signal of the second input terminal, a second pull-down driving unit suitable for pull-down driving the second output terminal, and a differential amplification unit suitable for differentially amplifying signals of the first output terminal and the second output terminal.

In an embodiment, a receiver circuit may include first to N-th first input terminals, first to N-th first pull-up driving units respectively suitable for pull-up driving corresponding one of first output terminals based on corresponding signals of the first input terminals, first to N-th first pull-down driving units respectively suitable for pull-down driving the corresponding one of the first output terminals, first to N-th capacitors respectively connected between corresponding one of the first input terminals and the corresponding one of the first output terminals, a second input terminal, a second pull-up driving unit suitable for pull-up driving an output terminal bar based on a signal of the second input terminal, a second pull-down driving unit suitable for pull-down driving the second output terminal, and first to N-th differential amplification units suitable for differentially amplifying signals of the first output terminals and a signal of the second output terminal.

In an embodiment, an equalizer circuit may include an input terminal, a pull-down driving unit suitable for pull-down driving an output terminal based on a signal of the input terminal, a pull-up driving unit suitable for pull-up driving the output terminal, and a capacitor connected between the input terminal and the output terminal.

DETAILED DESCRIPTION

Figure 1:
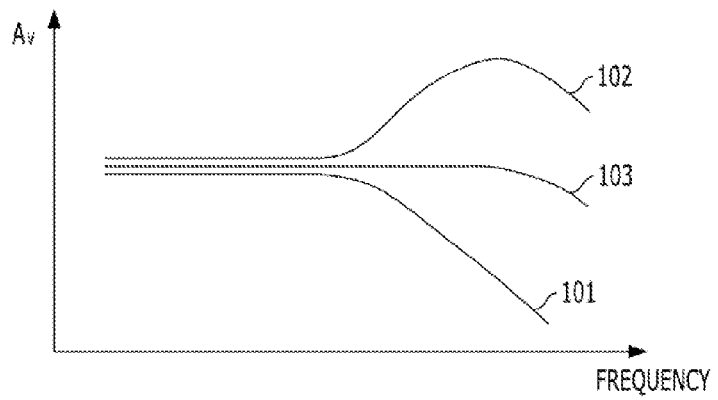
FIG. 1 is a diagram illustrating frequency responses of a channel 101, an equalizer 102, and a signal 103 recovered by the equalizer.
Figure 2:
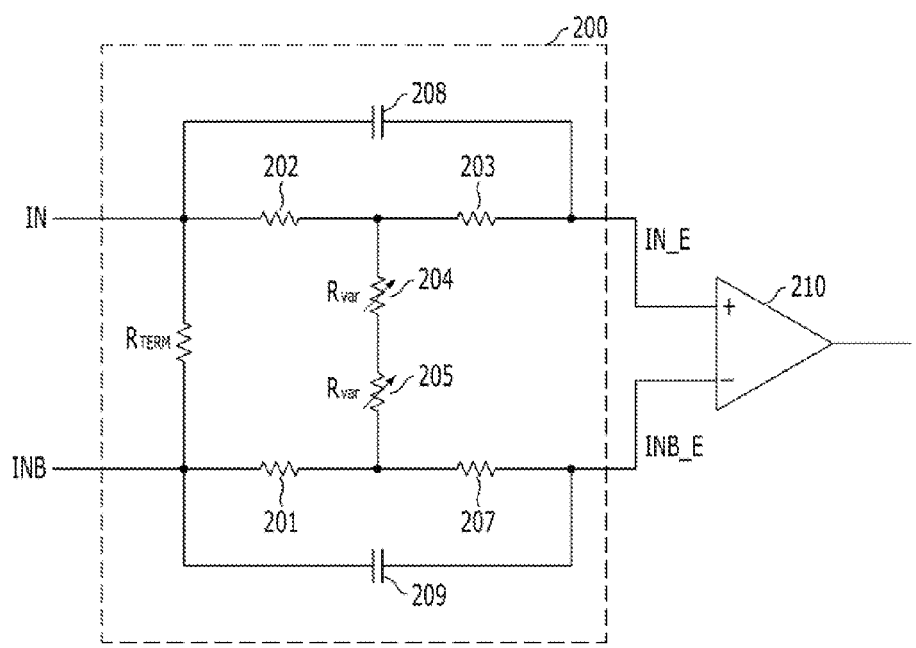
FIG. 2 is a configuration diagram of a conventional equalizer 200.
Figure 3:
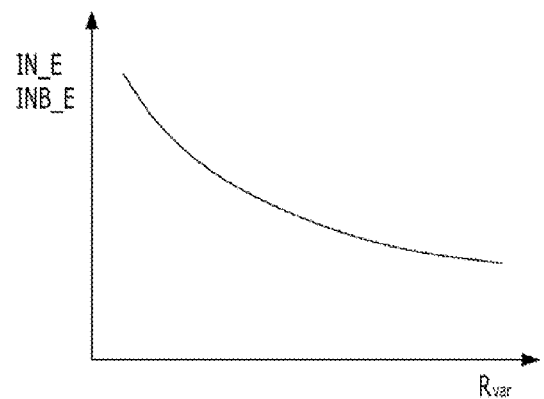
FIG. 3 illustrates low voltage value of equalized signals IN_E and INB_E based on resistance values Rvar of variable resistors 204 and 205.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, reference numerals correspond directly to the like numbered parts in the various figures and embodiments of the present invention.

It is also noted that in this specification, "connected/coupled" refers to one component not only directly coupling another component but also indirectly coupling another component through an intermediate component. In addition, a singular form may include a plural form as long as it is not specifically mentioned in a sentence.

Figure 4:
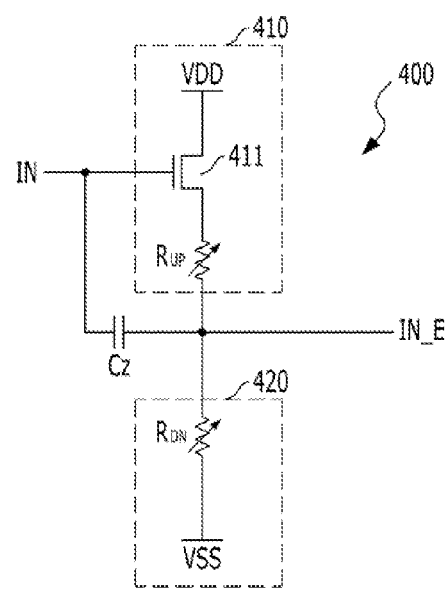
FIG. 4 is a configuration diagram of an equalizer circuit 400 in accordance with an embodiment of the present invention.

FIG. 4 is a configuration diagram of an equalizer circuit 400 in accordance with an embodiment of the present invention.

Referring to FIG. 4, the equalizer circuit 400 includes a pull-up driving unit 410, a pull-down driving unit 420, and a capacitor $C_Z$. FIG. 4 illustrates that the equalizer circuit 400 uses a power supply voltage VDD as a pull-up voltage, and uses a ground voltage VSS as a pull-down voltage. However, other voltages may be used as the pull-up and pull-down voltages.

The pull-up driving unit 410 is configured to pull-up drive an output terminal IN_E of the equalizer circuit 400 based on a signal of an input terminal IN of the equalizer circuit 400. The drivability of the pull-up driving unit 410 increases as the voltage level of the signal of the input terminal IN increases. The pull-up driving unit 410 may include a pull-up variable resistor $R_{UP}$ and a switch element 411. The pull-up variable resistor $R_{UP}$ is configured to pull-up drive the output terminal IN_E, and the switch element 411 is configured to control the pull-up driving operation of the pull-up variable resistor $R_{UP}$ based on the signal of the input terminal IN. The switch element 411 may be an NMOS transistor.

The pull-down driving unit 420 is configured to pull-down drive the output terminal IN_E. The pull-down driving unit 420 may include a variable resistor $R_{DN}$.

The capacitor $C_Z$ is connected between the input terminal IN and the output terminal IN_E, and configured to form a pole of a frequency response of the equalizer circuit 400.

In the equalizer circuit 400 of FIG. 4, the signal of the input terminal IN is applied to the gate of the transistor 411. Thus, a direct current path is not formed between the input terminal IN and voltage terminals VDD and VSS or between the input terminal IN and the output terminal IN_E. Therefore, an excessive current loss may be prevented in the input terminal IN. As a result, the equalizer circuit 400 is suitable for the pseudo-differential signal transmission system which uses the reference voltage VREF driven with a relatively small amount of current.

Figure 5:
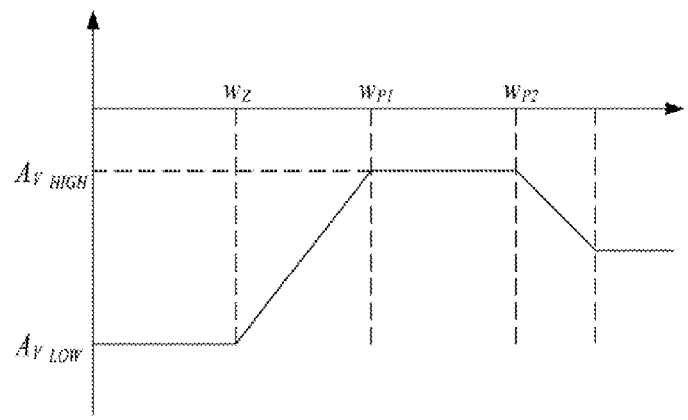
FIG. 5 is a graph illustrating frequency response characteristics of the equalizer circuit 400.

FIG. 5 is a graph illustrating frequency response characteristics of the equalizer circuit 400. In FIG. 5, zero $\omega_Z$, poles $\omega_{P1}$ and $\omega_{P2}$, and gains $A_{V|LOW}$ and $A_{V|HIGH}$ may be expressed as follows.

$$\omega_Z = 1/\{(R_{MOS}+R_{UP})*C_Z\}$$

$$\omega_{P1} = 1/[\{(R_{MOS}+R_{UP})//R_{DN}\}C_Z]$$

$$\omega_{P2} = 1/(R_{ESR}*C_Z)$$

$$A_{V|LOW} = R_{DN}/\{(R_{MOS}+R_{UP}+R_{DN})*C_Z\}$$

$$A_{V|HIGH} = C_Z/(C_Z+C_{PAR})$$

Here, $R_{MOS}$ represents a resistance value of the switch element 411, $C_{PAR}$ represents parasitic capacitance between the output terminal IN_E and the pull-down voltage terminal VSS, and $R_{ESP}$ represents resistance of the capacitor $C_Z$ when supposing that the capacitor $C_Z$ is represented as a pure capacitor and a serially connected resistor.

Figure 6:
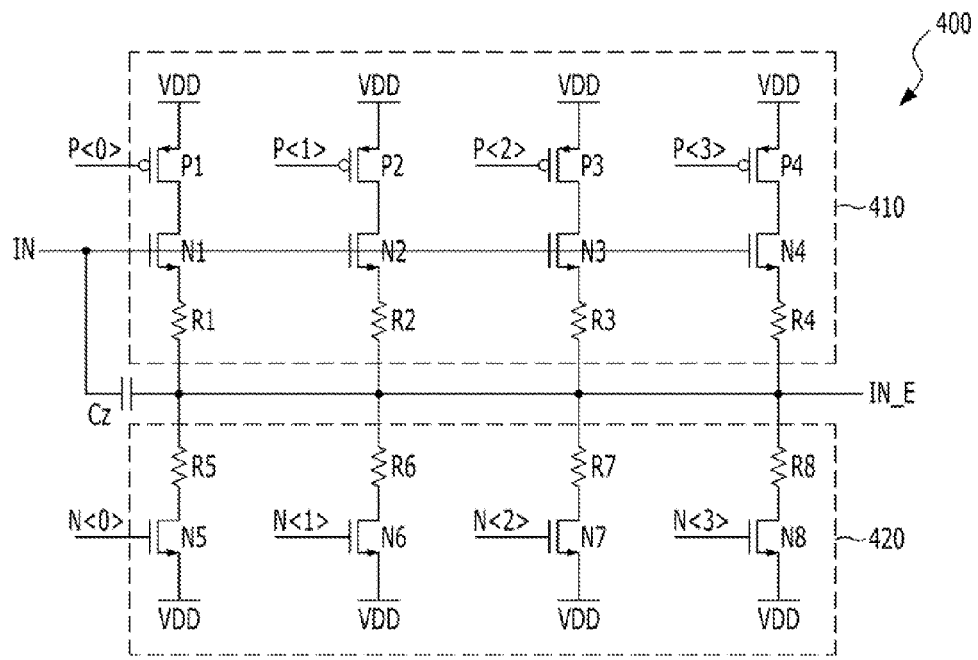
FIG. 6 is a detailed configuration diagram of the equalizer circuit 400 shown in FIG. 4.

FIG. 6 is a detailed configuration diagram of the equalizer circuit 400.

Referring to FIG. 6, the pull-up driving unit 410 may include a plurality of PMOS transistors P1 to P4, a plurality of NMOS transistors N1 to N4, and a plurality of pull-up resistors R1 to R4. The PMOS transistors P1 to P4 and the pull-up resistors R1 to R4 correspond to the pull-up variable resistor $R_{UP}$ of FIG. 4, and the NMOS transistors N1 to N4 correspond to the switch element 411 of FIG. 4. The PMOS transistors P1 to P4 are configured to receive the respective bits of a first code P<0:3>. The first code P<0:3> controls the resistance value of the pull-up variable resistor $R_{UP}$. As the number of PMOS transistors turned on by the first code increases, the resistance value of the pull-up variable resistor $R_{UP}$ decreases.

The pull-down driving unit 420 includes a plurality of NMOS transistors N5 to N8 and a plurality of pull-down resistors R5 to R8. The NMOS transistors N5 to N8 are configured to receive the respective bits of a second code N<0:3>. The second code N<0:3> adjusts the resistance value of the pull-down variable resistor $R_{DN}$. As the number of NMOS transistors turned on by the second code increases, the resistance value of the pull-down variable resistor $R_{DN}$ decreases.

The first code P<0:3> and the second code N<0:3> may be adjusted to change the resistance values of the variable resistors $R_{UP}$ and $R_{DN}$, which causes the change of the frequency response characteristic of the equalizer circuit 400.

Figure 7:
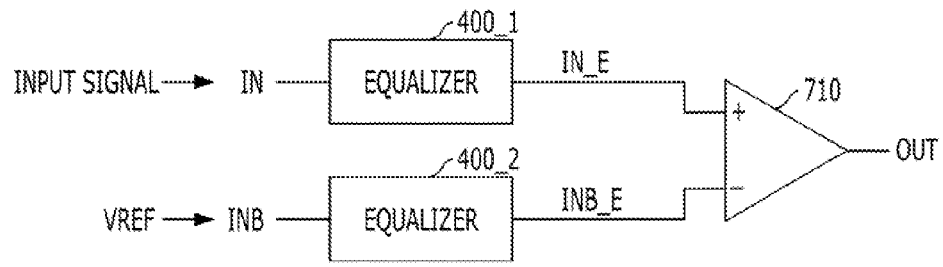
FIG. 7 is a configuration diagram of a receiver circuit in accordance with an embodiment of the present invention.

FIG. 7 is a configuration diagram of a receiver circuit in accordance with an embodiment of the present invention.

Referring to FIG. 7, the receiver circuit includes a first equalizer circuit 400_1, a second equalizer circuit 400_2, and a differential amplification unit 710. The first equalizer circuit 400_1 is configured to equalize a signal of a first terminal IN, and the second equalizer circuit 400_2 is configured to equalize a signal of a second terminal INB. The differential amplification unit 710 is configured to differentially amplify signals of output terminals IN_E and INB_E of the first and second equalizer circuits 400_1 and 400_2. An input signal INPUT SIGNAL to be received by the receiver circuit is applied to the first terminal IN, and a reference voltage VREF is inputted to the second terminal INB. The reference voltage VREF serves as a reference for determining the logic high and low levels of the input signal INPUT SIGNAL.

The first equalizer circuit 400_1 is configured to equalize the input signal INPUT SIGNAL applied to the first terminal IN. The first equalizer circuit 400_1 may be configured as described with reference to FIGS. 4 and 6, and may have a frequency response characteristic as illustrated in FIG. 5.

The second equalizer circuit 400_2 is configured to equalize the reference voltage VREF applied to the second terminal INB. The second equalizer circuit 400_2 serves to vary the level of the equalized reference voltage VREF_E based on variation of common mode level of the input signal IN_E equalized by the first equalizer circuit 400_1. The second equalizer circuit 400_2 may be configured as described with reference to FIGS. 4 and 6 except for the capacitor $C_Z$. The capacitor $C_Z$ may be omitted since the reference voltage VREF having only a DC component without an AC component is applied to the second equalizer circuit 400_2. The second equalizer circuit 400_2 may be formed to be of smaller size than the first equalizer circuit 400_1. For example, internal elements of the second equalizer circuit 400_2 may be formed at a size corresponding to 1/N of those of the first equalizer circuit 400_1 where N is a real number larger than one. It is preferable to design the second equalizer circuit 400_2 in the same manner as the first equalizer circuit 400_1 but with a smaller size than the first equalizer circuit 400_1 for the pseudo-differential signal transmission system where the reference voltage VREF is driven by a current with intensity much smaller than the input signal INPUT SIGNAL.

The differential amplification unit 710 is configured to differentially amplify signals of the output terminals IN_E and INB_E of the first and second equalizer circuits 400_1 and 400_2. When the voltage level of the output terminal IN_E is higher than the voltage level of the output terminal INB_E, the differential amplification unit 710 outputs a signal OUT with a logic 'HIGH, and when the voltage level of the output terminal INB_E is higher than the voltage level of the output terminal IN_E, the differential amplification unit 710 outputs the signal OUT with a logic 'LOW'.

The receiver circuit of FIG. 7 equalizes a frequency gain of the input signal INPUT SIGNAL by using the first equalizer circuit 400_1 while varying the level of the reference voltage VREF by using the second equalizer circuit 400_2 based on the variation of common mode level of the input signal INPUT SIGNAL by the first equalizer circuit 400_1. Furthermore, the receiver circuit differentially amplifies the equalized input signal IN_E and the equalized reference voltage INB_E through the differential amplification unit 710 to accurately detect the input signal INPUT SIGNAL.

Figure 8:
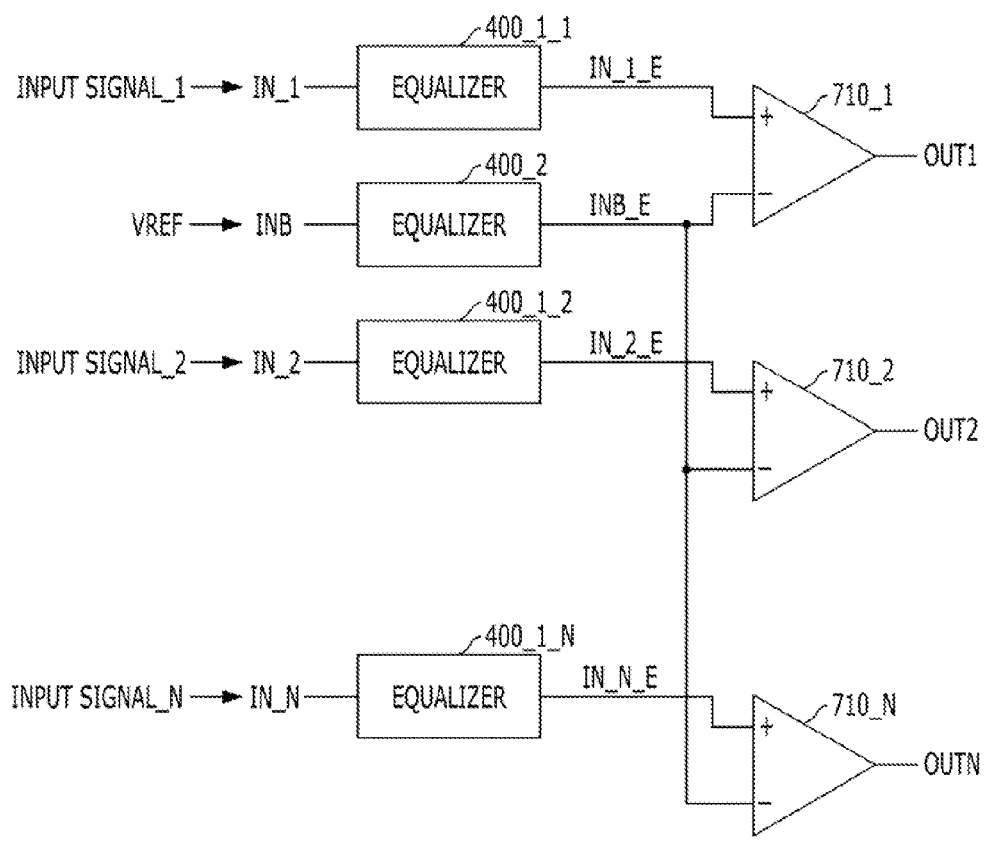
FIG. 8 is a configuration diagram of a receiver circuit in accordance with another embodiment of the present invention.

FIG. 8 is a configuration diagram of a receiver circuit in accordance with another embodiment of the present invention.

FIG. 8 illustrates a receiver circuit to receive a plurality of input signals INPUT SIGNAL_1 to INPUT SIGNAL_N. The receiver circuit of FIG. 8 includes a plurality of first equalizer circuits 400_1_1 to 400_1_N, a second equalizer circuit 400_2, and a plurality of differential amplification units 710_1 to 710_N. The first equalizer circuits 400_1_1 to 400_1_N are configured to equalize input signals INPUT SIGNAL_1 to INPUT SIGNAL_N of first to N-th input terminals IN_1 to IN_N. The second equalizer circuit 400_2 is configured to equalize a reference voltage VREF of a second terminal INB. The differential amplification units 710_1 to 710_N are configured to differentially amplify output signals IN_1_E to IN_N_E of the first equalizer circuits 400_1_1 to 400_1_N and an output signal INB_E of the second equalizer circuit 400_2.

The first equalizer circuits 400_1_1 to 400_1_N of FIG. 8 is configured in the same manner as the first equalizer circuit 400_1 of FIG. 7, and the second equalizer circuit 400_2 of FIG. 8 is configured in the same manner as the second equalizer circuit 400_2 of FIG. 7. The differential amplification units 710_1 to 710_N of FIG. 8 are configured in the same manner as the differential amplification unit 710 of FIG. 7.

Referring to FIG. 8, it can be seen that the plurality of input signals INPUT SIGNAL_1 to INPUT SIGNAL_N need to be equalized while only one equalizer for equalizing the reference voltage VREF, that is, only the equalizer circuit 400_2 may be used.

Figure 9:
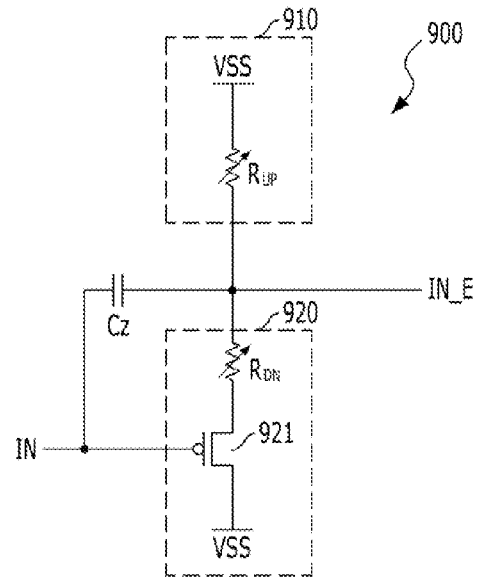
FIG. 9 is a configuration diagram of an equalizer circuit 900 in accordance with another embodiment of the present invention.

FIG. 9 is a configuration diagram of an equalizer circuit 900 in accordance with another embodiment of the present invention. FIG. 9 illustrates an equalizer circuit in which a pull-down driving unit 920 pull-down drives an output terminal IN_E based on a signal of an input terminal IN, which is different from the equalizer circuit 400 of FIG. 4.

Referring to FIG. 9, the equalizer circuit 900 includes a pull-up driving unit 910, a pull-down driving unit 920, and a capacitor $C_Z$.

The pull-up driving unit 910 is configured to pull-up drive an output terminal IN_E. The pull-up driving unit 910 may include a pull-up variable resistor $R_{UP}$.

The pull-down driving unit 920 is configured to pull-down drive the output terminal IN_E of the equalizer circuit 900 based on a signal of the input terminal IN of the equalizer circuit 900. The drivability of the pull-down driving unit 920 increases as the voltage level of the signal of the input terminal IN decreases. The pull-down driving unit 920 may include a pull-down variable resistor $R_{DN}$ for pull-down driving the output terminal IN_E and a switch element 921 for controlling the pull-down driving operation of the pull-down variable resistor $R_{DN}$ based on the signal of the input terminal IN. The switch element 921 may be a PMOS transistor.

The equalizer circuit 900 of FIG. 9 is configured and operated in the same manner as the equalizer circuit 400, except that the pull-down drivability is adjusted based on the signal of the input terminal IN instead of the pull-up drivability. The detailed descriptions of the equalizer circuit 900 are omitted herein.

Figure 10:
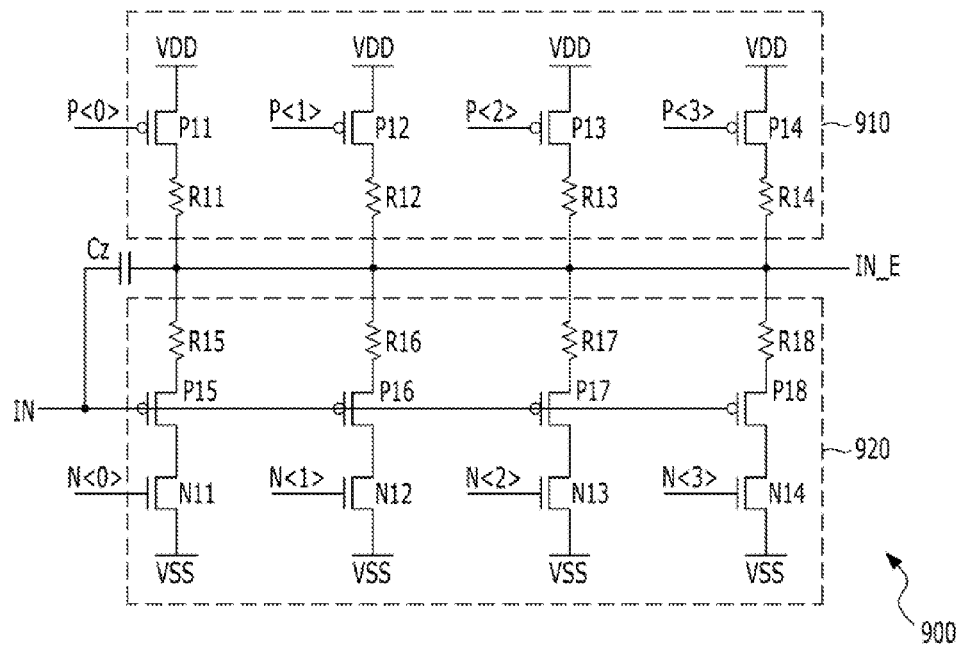
FIG. 10 is a detailed configuration diagram of the equalizer circuit 900 shown in FIG. 9.

FIG. 10 is a detailed configuration diagram of the equalizer circuit 900.

Referring to FIG. 10, the pull-up driving unit 910 may include a plurality of PMOS transistors P11 to P14 and a plurality of pull-up resistors R11 to R14. The PMOS transistors P11 to P14 are configured to receive the respective bits of a first code P<0:3>. The first code P<0:3> adjusts the resistance value of the pull-up variable resistor $R_{UP}$. As the number of transistors turned on by the first code increases, the resistance of the pull-up variable resistor $R_{UP}$ decreases.

The pull-down driving unit 920 may include a plurality of NMOS transistors N11 to N14, a plurality of PMOS transistors P15 to P18, and a plurality of pull-down resistors R15 to R18. The NMOS transistors N11 to N14 and the pull-down resistors R15 to R18 correspond to the pull-down variable resistor $R_{DN}$ of FIG. 9, and the PMOS transistors P15 to P18 correspond to the switch element 921 of FIG. 9. The NMOS transistors N11 to N14 are configured to receive the respective bits of a second code N<0:3>. The second code N<0:3> controls the resistance value of the pull-down variable resistor $R_{DN}$. As the number of NMOS transistors turned on by the second code increases, the resistance value of the pull-down variable resistance $R_{DN}$ decreases.

The first code P<0:3> and the second code N<0:3> may be adjusted to change the resistance values of the variable resistors $R_{UP}$ and $R_{DN}$, which causes the change of the frequency response characteristic of the equalizer circuit 900.

The equalizer circuit 900 of FIGS. 9 and 10 may be used in the receiver circuit of FIGS. 7 and 8, instead of the equalizer circuit 400 illustrated in FIGS. 4 and 6.

In the embodiments of FIGS. 4, 6, 9, and 10, it has been described that the frequency response characteristic of the equalizer circuit is controlled by adjusting the resistance values of the variable resistors $R_{UP}$ and $R_{DN}$. However, the frequency response characteristic of the equalizer circuit may be controlled by adjusting the capacitance of the capacitor $C_Z$ as well as the resistance values of the variable resistors $R_{UP}$ and $R_{DN}$.

In accordance with the embodiment of the present invention, it may be possible to provide an equalizer circuit suitable for a pseudo-differential signal transmission system and a receiving circuit including the same.

Although various embodiments have been described for illustrative purposes, it will be apparent to those skilled in the art that various changes and modifications may be made without departing from the spirit and scope of the invention as defined in the following claims.

What is claimed:

1. An equalizer circuit comprising:
   an input terminal;
   a pull-up driving unit suitable for pull-up driving an output terminal based on a signal of the input terminal;
   a pull-down driving unit suitable for pull-down driving the output terminal; and
   a capacitor connected between the input terminal and the output terminal
   wherein the drivability of the pull-up driving unit is adjusted by using a first code for use in adjusting of a pull-up resistance of the pull-up driving unit, and the drivability of the pull-down driving unit is adjusted by using a second code for use in adjusting of a pull-down resistance of the pull-down driving unit.

2. The equalizer circuit of claim 1, wherein the pull-up driving unit comprises:
   a pull-up variable resistor for use in pull-up driving of the output terminal; and
   a switch element suitable for controlling the pull-up driving operation of the pull-up variable resistor based on the signal of the input terminal.

3. The equalizer circuit of claim 2, wherein the pull-down driving unit comprises a pull-down variable resistor for use in pull-down driving of the output terminal.

4. The equalizer circuit of claim 1, wherein the pull-up driving unit comprises:
   a plurality of PMOS transistors of which sources are connected to a pull-up voltage terminal and gates are suitable for receiving respective bits of the first code;
   a plurality of first NMOS transistors of which respective drains are connected to corresponding drains of the PMOS transistors and gates are suitable for receiving the signal of the input terminal; and
   a plurality of pull-up resistors respectively connected between corresponding sources of the first NMOS transistors and the output terminal.

5. The equalizer circuit of claim 4, wherein the pull-down driving unit comprises:
   a plurality of second NMOS transistors of which sources connected to a pull-down voltage terminal and gates are suitable for receiving respective bits of the second code; and
   a plurality of pull-down resistors respectively connected between corresponding drains of the second NMOS transistors and the output terminal.

6. A receiver circuit comprising:
   a first input terminal;
   a first pull-up driving unit suitable for pull-up driving a first output terminal based on a signal of the first input terminal;
   a first pull-down driving unit suitable for pull-down driving the first output terminal;
   a first capacitor connected between the first input terminal and the first output terminal;
   a second input terminal;
   a second pull-up driving unit suitable for pull-up driving a second output terminal based on a signal of the second input terminal;
   a second pull-down driving unit suitable for pull-down driving the second output terminal; and
   a differential amplification unit suitable for differentially amplifying signals of the first output terminal and the second output terminal,
   wherein the first pull-up driving unit comprises:
      a plurality of first PMOS transistors of which sources are connected to a pull-up voltage terminal and gates are suitable for receiving respective bits of a first code;
      a plurality of first NMOS transistors of which respective drains are connected to corresponding drains of the first PMOS transistors and gates are suitable for receiving the signal of the first input terminal; and
      a plurality of first pull-up resistors respectively connected between corresponding sources of the first NMOS transistors and the first output terminal.

7. The receiver circuit of claim 6, wherein the signal of the first input terminal is an input signal to the receiver, and the signal of the second input terminal is a reference voltage.

8. The receiver circuit of claim 7, wherein a ratio of the drivability of the first pull-up driving unit to the drivability of the second pull-up driving unit is N:1, and a ratio of the drivability of the first pull-down driving unit to the drivability of the second pull-down driving unit is N:1, where N is a real number larger than one.

9. The receiver circuit of claim 6, wherein the first pull-down driving unit comprises:

a plurality of second NMOS transistors of which sources connected to a pull-down voltage terminal and gates are suitable for receiving respective bits of a second code; and a plurality of first pull-down resistors respectively connected between corresponding drains of the second NMOS transistors and the first output terminal.

10. The receiver circuit of claim 7, wherein the second pull-up driving unit comprises:

a plurality of second PMOS transistors of which sources are connected to the pull-up voltage terminal and gates are suitable for receiving respective bits of the first code;

a plurality of third NMOS transistors of which respective drains connected to corresponding drains of the second PMOS transistors and gates are suitable for receiving the signal of the second input terminal; and a plurality of second pull-up resistors respectively connected to corresponding sources of the third NMOS transistors and the second output terminal.

11. The receiver circuit of claim 10, wherein the second pull-down driving unit comprises:

a plurality of fourth NMOS transistors of which sources are connected to the pull-down voltage terminal and gates are suitable for receiving respective bits of the second code; and a plurality of second pull-down resistors respectively connected to corresponding drains of the fourth NMOS transistors and the second output terminal.

12. An equalizer circuit comprising:

an input terminal;

a pull-down driving unit suitable for pull-down driving an output terminal based on a signal of the input terminal;

a pull-up driving unit suitable for pull-up driving the output terminal; and a capacitor connected between the input terminal and the output terminal, wherein the pull-down driving unit comprises:

a plurality of NMOS transistors of which sources are connected to a pull-down voltage terminal and gates are suitable for receiving respective bits of a first code;

a plurality of first PMOS transistors of which respective drains connected to corresponding drains of the NMOS transistors and gates are suitable for receiving the signal of the input terminal; and a plurality of pull-up resistors respectively connected between corresponding sources of the first PMOS transistors and the output terminal.

13. A receiver circuit comprising:

first to N-th first input terminals;

first to N-th first pull-up driving units respectively suitable for pull-up driving corresponding one of first output terminals based on corresponding signals of the first input terminals;

first to N-th first pull-down driving units respectively suitable for pull-down driving corresponding one of the first output terminals;

first to N-th capacitors respectively connected between corresponding one of the first input terminals and corresponding one of the first output terminals;

a second input terminal;

a second pull-up driving unit suitable for pull-up driving a second output terminal based on a signal of the second input terminal;

a second pull-down driving unit suitable for pull-down driving the second output terminal; and first to N-th differential amplification units respectively suitable for differentially amplifying signals of the first output terminals and a signal of the second output terminal.

14. The receiver circuit of claim 13, wherein the signals of the first input terminals are input signals to the receiver circuit, and the signal of the second input terminal is a reference voltage.

15. The equalizer circuit of claim 12, wherein the pull-up driving unit comprises:

a plurality of second PMOS transistors of which sources connected to a pull-up voltage terminal and gates are suitable for receiving respective bits of a second code; and a plurality of pull-up resistors respectively connected between corresponding drains of the second PMOS transistors and the output terminal.

* * * * *